Aug. 14, 1945.   F. R. NEWELL   2,382,250
MACHINISTS GAUGE AND MITER MEASURING DEVICE
Filed March 29, 1943

INVENTOR
Felix R. Newell
BY
Barthel & Bugbee
ATTORNEYS

Patented Aug. 14, 1945

2,382,250

UNITED STATES PATENT OFFICE 2,382,250

MACHINIST'S GAUGE AND MITER MEASURING DEVICE

Felix R. Newell, Detroit, Mich.

Application March 29, 1943, Serial No. 480,915

1 Claim. (Cl. 33—96)

The present invention relates to measuring instruments and, more particularly, to a measuring instrument for laying off various forms and pieces of work.

The primary object of this invention is to provide a device which may be easily carried about in the pocket of the user and which may be adapted for marking and laying off various angles and circular measurements.

Another object of the invention is to provide a measuring instrument which may be used by machinists as a regular machinists' rule in determining various reference points in the laying out of work as well as being used for determining and measuring angular and circular markings on various work pieces.

Another object of the invention is to provide a combined machinist's gauge with flanged portions at each end thereof extending in opposite directions to facilitate the positioning of the gauge to various work surfaces whereby the rule may be used as a straight edge in the marking and laying off of work.

Another object of the invention is to provide a combined machinist's rule and miter measuring device formed from a single stamping and which contains no movable parts to become out of adjustment or misplaced.

Other objects and advantages of the invention will become apparent during the course of the following description of the accompanying drawing, wherein.

Figure 2:
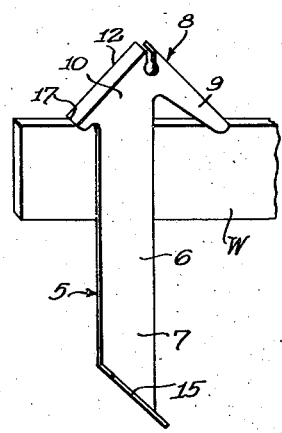
Figure 2 is a perspective view of the device illustrating the manner in which the same is applied to a piece of work in marking transversals.

In the drawing, wherein for the purpose of illustrating the invention and wherein like reference characters will be employed to designate like parts throughout the same, the reference character 5 will generally be employed to represent and designate a machinist's gauge or rule having graduated markings 6 along one edge thereof. The rule 5 is made of metal or the like and comprises a body portion 7 which is preferably formed of substantially the same width throughout its length.

One end of the body portion 7 is provided with a spear-shaped end 8 forming an offset wing portion 9 and a bevelled edge portion 10. The offset portion 9 is provided with a downwardly depending flange 11 while the bevelled edge portion 10 is provided with a flange 12 extending in the same direction. The arrow-shaped head 8 is cut inwardly as at 13 to facilitate the spacing of the inner ends of the flanges 11 and 12 and to allow for the accurate bending thereof so that a line coextensive with the graduated edge of the rule 5 will intersect said opening and provide a straight edge diagonal to the flanges 11 and 12.

The opposite end of the elongated body portion 7 is bent upwardly or in opposed relation to the flanges 11 and 12 on a diagonal line 14 to provide a guide 15 at approximately 45 degrees to the graduated edge 6 of the body portion 7.

It is to be noted that the flanges 11 and 12 are provided with relatively spaced outer end portions 16 and 17 which may be placed along one edge of a piece of work W as shown in Figure 2 so that a pencil or other marking device may be moved along the graduated straight edge 6 to mark the transversals or other gauge marks thereon.

Figure 3:
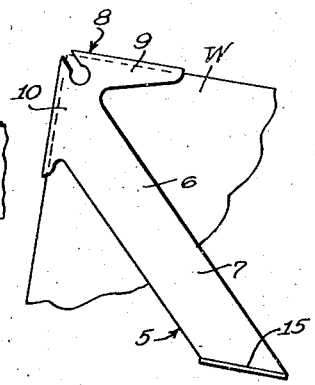
Figure 3 is a top plan view of the device showing the same applied to the right angular corner portion of a piece of work for inscribing oblique or diagonal lines thereon.

When using the device to mark diagonals on a piece of work W as shown in Figure 3, the spear head end 8 is placed so that the flanges 11 and 12 of the wings 9 engage the corner portions of the work whereby a pencil or other marking device may be moved along the graduated straight edge 6 so that an accurate line will be drawn on the work W.

Figure 4:
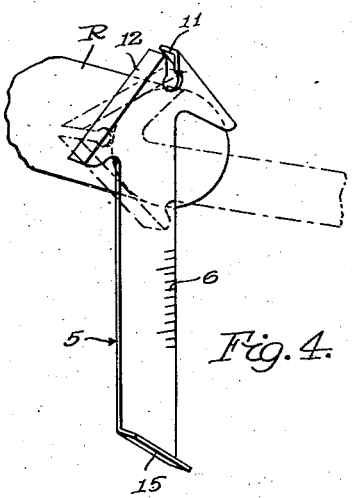
Figure 4 is a perspective view of the measuring instrument showing the manner in which the same is applied to the end of a piece of round work for inscribing diametrical lines thereon in order to locate the center of the work.
Figure 1:
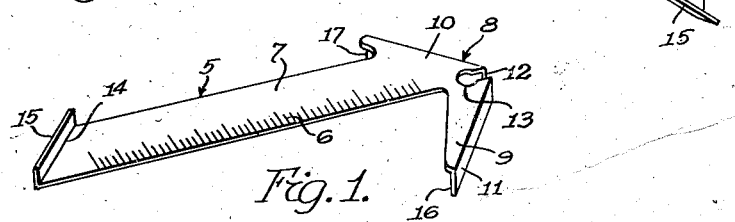
Figure 1 is a perspective view of the device embodying the invention illustrating the same with one of its faces graduated by linear markings.

As shown in Figure 4, the measuring instrument may be applied to the end wall of a piece of round work R so that the flanges 11 and 12 will engage the peripheral portion of the work whereby the graduated straight edge will extend through the center of the end wall to facilitate the marking thereof whereby partial rotation of the instrument to the dotted line position may be had so that a second marking may be made to determine the exact center of the work.

Figure 5:
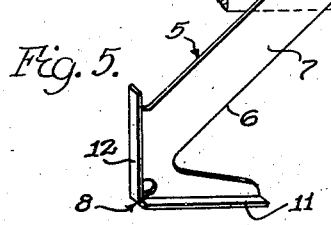
Figure 5 is a perspective view of the measuring instrument illustrating the manner in which the same is applied to a piece of work when marking miter lines thereon.

In Figure 5 the measuring instrument 5 is shown as being applied to a piece of work W so that the flange 15 will extend over one edge thereof with the graduated straight edge 6 extending diagonally or obliquely whereby miter lines may be marked on the work when cutting miter drawings.

Figure 6:
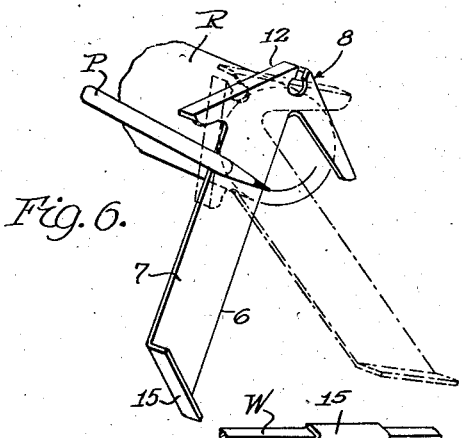
Figure 6 is a perspective view illustrating the measuring instrument applied to the end of a round piece of work for inscribing circumfertial lines thereon.

By applying the arrow-shaped head 8 to a piece of round work as shown in Figure 6 so that the flanges 11 and 12 engage the peripheral portion of the work, a pencil or other marking instrument P may be applied in a set position along the graduated straight edge 6 of the body portion 7 so that a circular line may be inscribed on the end wall of the round work by shifting the measuring instrument from the dotted line position to the full line position, or swinging the same about an arc from the center of the round work.

Figure 7:
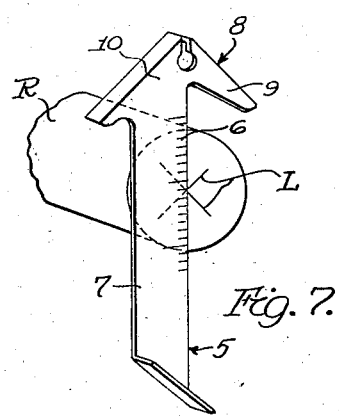
Figure 7 is a perspective view of the measuring instrument illustrating the manner in which the device may be used in the marking of radial center lines.

After the center lines L have been marked on the end wall of the round work R as shown in Figure 7, the body portion 7 of the gauge 5 may be applied thereto for making various measurements from the center of the work to the peripheral portion, or in determining the diameter of the work as well as other dimensions incident thereto.

Although the various figures in the drawing illustrate the manner in which the implement may be used, they are only to be taken as exemplary uses and it is understood that various other uses may be had by simply shifting the gauge to the desired position.

It is to be noted that the flange 15 extends in the opposite direction from the flanges 11 and 12 to facilitate the positioning of the elongated body portion 7 along the surface of the work so that said body portion will lie flush therewith and the flanges at either end will not interfere with the markings or the accuracy thereof.

It is also to be understood that the form of the invention herewith shown and described is to be taken as a preferred embodiment of the same and that various changes in the shape, size and form may be resorted to without departing from the spirit of the invention or the scope of the subjoined claim.

What I claim is:

A measuring implement, comprising an elongated flat body portion providing a straight edge, a spear-head end formed on said body portion and offset therefrom so that the straight edge will intersect the vertices of said spear-head, said flat body portion and spear-headed end being formed from a single blank of material and stamped to provide downwardly depending flanges formed on the spear-head arranged at right angles to one another and at acute angles to the body portion, said downwardly depending flanges being slightly separated at the apex of the spear-head to permit bending of said downwardly depending flanges into said angular positions.

FELIX R. NEWELL.